US012624246B2

(12) United States Patent
Nava Ortiz et al.

(10) Patent No.: US 12,624,246 B2
(45) Date of Patent: May 12, 2026

(54) CURABLE FILM-FORMING COMPOSITIONS AND COATED STRUCTURES WITH IMPROVED CORROSION RESISTANCE AND DURABILITY

(71) Applicant: PPG Industries Ohio, Inc., Cleveland, OH (US)

(72) Inventors: César Alejandro Bernabé Nava Ortiz, Atizapán de Zaragoza (MX); Ganesh Desai, Libertyville, IL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 383 days.

(21) Appl. No.: 18/557,390

(22) PCT Filed: Feb. 24, 2022

(86) PCT No.: PCT/US2022/070804
§ 371 (c)(1),
(2) Date: Oct. 26, 2023

(87) PCT Pub. No.: WO2022/232720
PCT Pub. Date: Nov. 3, 2022

(65) Prior Publication Data
US 2024/0218205 A1 Jul. 4, 2024

Related U.S. Application Data

(60) Provisional application No. 63/180,904, filed on Apr. 28, 2021.

(51) Int. Cl.

| | |
|---|---|
| ***C09D 175/06*** | (2006.01) |
| ***C08G 18/32*** | (2006.01) |
| ***C08G 18/62*** | (2006.01) |
| ***C08G 18/72*** | (2006.01) |
| ***C08G 18/79*** | (2006.01) |

(52) U.S. Cl.
CPC ....... *C09D 175/06* (2013.01); *C08G 18/3256* (2013.01); *C08G 18/6229* (2013.01); *C08G 18/722* (2013.01); *C08G 18/792* (2013.01)

(58) Field of Classification Search
CPC .. C09D 175/06; C09D 175/02; C09D 175/04; C08G 18/3256; C08G 18/6229; C08G 18/722; C08G 18/792; C08G 18/3821; Y02E 10/72
See application file for complete search history.

(56) References Cited

U.S. PATENT DOCUMENTS

| | | | |
|---|---|---|---|
| 5,243,012 | A | 9/1993 | Wicks et al. |
| 7,169,876 | B2 | 1/2007 | Asher |
| 7,611,772 | B2 | 11/2009 | Barancyk |
| 8,557,388 | B2 | 10/2013 | Hong |
| 8,691,929 | B2 | 4/2014 | Millero, Jr. |
| 9,944,821 | B2 | 4/2018 | Squiller et al. |
| 2004/0010091 | A1 | 1/2004 | Paquet, Jr. et al. |
| 2005/0106395 | A1 | 5/2005 | Asher |
| 2011/0076485 | A1 | 3/2011 | Yakulis |

FOREIGN PATENT DOCUMENTS

| | | | |
|---|---|---|---|
| EP | 3211040 | A1 | 8/2017 |
| WO | 2016/210237 | A1 | 12/2016 |

OTHER PUBLICATIONS

International Search Report and Written Opinion received for PCT Application Serial No. PCT/US2022/070804 dated May 17, 2022, 8 pages.

*Primary Examiner* — Michael C Miggins

(57) ABSTRACT

The present invention is directed to curable film-forming compositions and coating kits comprising: (1) a resinous component comprising: (a) an acrylic polyol; (b) an aliphatic ketimine that is substantially free, essentially free and/or completely free of silane functional groups; and optionally (c) a polyaspartic ester; and (2) a curing agent comprising at least two different aliphatic polyisocyanates. The present invention is further directed to coated structures comprising: (a) a component of a vehicle, building, bridge, industrial protective structure, construction equipment structure, ship, railcar, railcar container, water tower, power line tower, tunnel, oil or gas industry structure, marine structure, aerospace structure, bridge support structure, pipeline, oil rig, storage tank, or wind turbine, wherein the component comprises a metal substrate; and (b) a cured coating formed from the curable film-forming composition described above, applied directly or indirectly to at least one surface of the substrate.

20 Claims, No Drawings

CURABLE FILM-FORMING COMPOSITIONS AND COATED STRUCTURES WITH IMPROVED CORROSION RESISTANCE AND DURABILITY

CROSS REFERENCE TO RELATED APPLICATIONS

This application is a national stage filing of international patent application PCT/US22/70804, filed Feb. 2, 2022, titled "CURABLE FILM-FORMING COMPOSITIONS AND COATED STRUCTURES WITH IMPROVED CORROSION RESISTANCE AND DURABILITY", which in turn claims priority to U.S. Provisional Application No. 63/180,904, filed Apr. 28, 2021, titled "CURABLE FILM-FORMING COMPOSITIONS AND COATED STRUCTURES WITH IMPROVED CORROSION RESISTANCE AND DURABILITY". Both of the above priority documents are incorporated herein by reference in their entireties.

FIELD OF THE INVENTION

The present invention relates to curable film-forming compositions that demonstrate fast curing, improved corrosion resistance and durability properties, and to coated structures comprising these compositions.

BACKGROUND OF THE INVENTION

Currently, in the world industrial coatings market there is a need to have anticorrosive coatings that once applied, cure almost immediately, thus optimizing the operation times where these coatings, called "snap cure", are used. Coatings with excellent performance properties and that do not stop production lines are particularly sought after.

There are different polyaspartic products in the coatings market that offer good performance and curing properties. However, most of them are designed for the flooring industry. They offer excellent abrasion and chemical resistance properties, which are necessary and indispensable features in the flooring market, but none of them are intended as a direct-to-metal (DTM) coating, much less guarantee an excellent anticorrosive property when used in an industrial setting where substrates are subjected to long-term exposure to weather extremes and the elements.

Outdoor structures such as wind turbines, bridges, towers, and tanks, and fleet vehicles such as railcars, buses, trucks, construction vehicles and aircraft are constantly exposed to the elements and must be designed to endure temperature extremes, wind shears, precipitation, and other changing environmental conditions and hazards without significant damage or the need for constant maintenance, which may be time-consuming and costly. Likewise, marine structures such as ship hulls and off-shore oil rigs and wind turbines are also exposed to seawater as well as extreme weather and other environmental conditions, making them susceptible to corrosion.

It would be desirable to provide a curable film-forming composition with DTM capabilities (i. e., appropriate adhesion when applied directly to a metal surface), excellent performance properties, and short drying time, for the preparation of coated structures that will be exposed to long-term environmental conditions.

SUMMARY OF THE INVENTION

The present invention is directed to curable film-forming compositions and coating kits comprising:

(1) a resinous component comprising:
  (a) an acrylic polyol; and
  (b) an aliphatic ketimine that is substantially free, essentially free and/or completely free of silane functional groups; and optionally
  (c) a polyaspartic ester; and
(2) a curing agent comprising at least two different aliphatic polyisocyanates. The curable film-forming composition or kit comprises less than 10 percent by weight, or less than 5 percent by weight, or less than 2 percent by weight, or 0 percent by weight of a polyisocyanate polymer or prepolymer, based on the total weight of the curable film-forming composition or kit.

The present invention is further directed to coated structures comprising:

(a) a component of a vehicle, building, bridge, industrial protective structure, construction equipment structure, ship, railcar, railcar container, water tower, power line tower, tunnel, oil or gas industry structure, marine structure, aerospace structure, bridge support structure, pipeline, oil rig, storage tank, or wind turbine, wherein said component comprises a metal substrate; and
(b) a cured coating formed from the curable film-forming composition described above, applied directly to at least one surface of the substrate.

DETAILED DESCRIPTION OF THE INVENTION

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), each of which may be determined by gel permeation chromatography using a polystyrene standard), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents, and are used interchangeably with the terms "at least one" and "one or more", unless expressly and unequivocally limited to one referent. As used herein, the term "polymer" is meant to refer to both homopolymers and copolymers as understood in the art.

The various embodiments and examples of the present invention as presented herein are each understood to be non-limiting with respect to the scope of the invention. The term "including" and like terms mean "including but not limited to."

The curable film-forming compositions and coating kits of the present invention comprise (1) a resinous component. As used herein, the terms "thermosetting" and "curable" can be used interchangeably and refer to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. See Hawley, Gessner G., The Condensed Chemical Dictionary, Ninth Edition, page 856; Surface Coatings, vol. 2, Oil and Colour Chemists' Association, Australia, TAFE Educational Books (1974). Curing or crosslinking reactions also may be carried out under ambient conditions. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). Once cured or crosslinked, a thermosetting resin will not melt upon the application of heat and is insoluble in solvents. For example, a "cured composition" of some specific description, means that at least a portion of the polymerizable and/or crosslinkable components that form the curable composition is polymerized and/or crosslinked through reactive functional groups, to the extent that a cured film prepared from the composition demonstrates no damage from at least 50 methylethyl ketone (MEK) double rubs according to ASTM D5402-19. The test method may be performed, for example, using the specified cheesecloth or another suitable cloth such as a Wypall X80 towel available from Kimberly Clark Corporation. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion (e. g., at least 5 percent) of the reactive groups of the composition occurs, to form a polymerizate. The polymerizable composition can also be subjected to curing conditions such that a complete cure is attained (for example, greater than 50 percent of reactive groups, or greater than 60 percent of reactive groups, or greater than 80 percent of reactive groups have reacted) and wherein further curing results in no further improvement in polymer properties, such as hardness.

The term "reactive" refers to a functional group capable of undergoing a chemical reaction with itself and/or other functional groups spontaneously or upon the application of heat or actinic radiation, or in the presence of a catalyst or by any other means known to those skilled in the art.

The resinous component (1) comprises (a) an acrylic polyol. Generally any method of producing such polymers that is known to those skilled in the art utilizing art recognized amounts of monomers can be used. Suitable acrylic polyols include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Hydroxyl functional groups are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polyol can also be prepared with N-(alkoxymethyl)acrylamides and N-(alkoxymethyl)methacrylamides to incorporate amide functional groups into the polyol.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. (Note: these epoxy functional monomers may also be used to prepare epoxy functional acrylic polymers.) Examples of carboxylic acids include saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

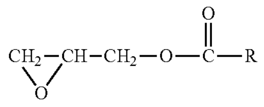

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Often the acrylic polyol is prepared from a monomer mixture comprising butyl acrylate and 2-hydroxyethyl acrylate. In a particular example, the acrylic polyol is prepared from a monomer mixture comprising butyl acrylate, 2-hydroxyethyl acrylate, methyl methacrylate, and styrene. When butyl acrylate and 2-hydroxyethyl acrylate are included in the monomer mixture, the weight ratio of butyl acrylate to 2-hydroxyethyl acrylate may range from 1:1 to 1.5:1, such as 1.1:1, or 1.15:1, or 1.16:1, or 1.2:1, or 1.3:1.

Typically, the acrylic polyol (a) has a hydroxyl equivalent weight of at least 650, or at least 670, or at least 690, and at most 750, or at most 720, or at most 700 g/equivalent. Thus, the acrylic polyol (a) may have a hydroxyl equivalent weight of 650 to 750 g/equivalent, or 650 to 720 g/equivalent, or 650 to 700 g/equivalent, or 670 to 750 g/equivalent, or 670 to 720 g/equivalent, or 670 to 700 g/equivalent, or 690 to 750 g/equivalent, or 690 to 720 g/equivalent, or 690 to 700 g/equivalent.

The acrylic polyol (a) is typically present in the curable film-forming composition or coating kit of the present invention in an amount of at least 10, such as at least 15, or least 20, or at least 25 percent by weight, based on the total weight of resin solids in the curable film-forming composition or coating kit. The acrylic polyol (c) may be present in the curable film-forming composition or coating kit of the present invention in an amount of at most 50, such as at most 40, or at most 30 percent by weight, based on the total weight of resin solids in the curable film-forming composition or coating kit. Thus, the acrylic polyol may be present in the curable film-forming composition or coating kit in an amount, for example, of 10 to 50 percent by weight, or 10 to 40 percent by weight, or 10 to 30 percent by weight, or 15 to 50 percent by weight, or 15 to 40 percent by weight, or 15 to 30 percent by weight, or 20 to 50 percent by weight, or 20 to 40 percent by weight, or 20 to 30 percent by weight, or 25 to 50 percent by weight, or 25 to 40 percent by weight, or 25 to 30 percent by weight. It is usually present in an amount of 10 to 30 percent by weight.

As used herein "based on the total weight of resin solids" means that the amount of the component added during the formation of the composition is based upon the total weight of the non-volatile resins of the film forming materials, including cross-linkers, reactive diluents, and polymers present during the formation of the composition, but not including any water, volatile organic solvent, or any additive solids such as hindered amine stabilizers, photoinitiators, pigments including extender pigments and fillers, flow modifiers, catalysts, and UV light absorbers, unless otherwise indicated. The phrases "based on the total solid weight" and "based on the total weight of solids" (used interchangeably) of the composition means that the amount of the component added during the formation of the composition is based upon the total weight of the solids (non-volatiles) of the film forming materials, including cross-linkers, reactive diluents, and polymers, pigments including extender pigments and fillers, additive solids such as hindered amine stabilizers, photoinitiators, flow modifiers, catalysts, and UV light absorbers present during the formation of the composition, but not including any water or volatile organic solvent, unless otherwise indicated. Typically, the total weight of resin solids as used herein with respect to the compositions of the present invention refers to the total resin weight of the resinous component (1) and curing agent (2).

The resinous component (1) further comprises (b) an aliphatic ketimine. The aliphatic ketimine is substantially free, essentially free and/or completely free of silane functional groups. As used herein, the term "substantially free", "essentially free" or "completely free" with respect to the presence of a functional group means that the functional group is present, if at all, in an amount of 3% or less, 0.1% or less, or 0.00%, respectively, the percentage based upon the total number of the functional group relative to the total number of functional groups.

The aliphatic ketimine may be prepared as known in the art by reacting an aliphatic diamine with an aliphatic ketone. Examples of suitable diamines include isophorone diamine, ethylene diamine, 1,2-diaminopropane, 1,3-diaminopropane, 1,4-diaminobutane, 1,5-diaminopentane, 1,6-diaminohexane, 1,8-diaminooctane, 2-methyl-1,5-pentane diamine, 2,5-diamino-2,5-dimethylhexane, 2,2,4-trimethyl-1,6-diamino-hexane, 2,4,4-trimethyl-1,6-diamino-hexane, 1,11-diaminoundecane, 1,12-diaminododecane, 1,3-cyclohexane diamine, 1,4-cyclohexane diamine, 1-amino-3,3,5-trimethyl-5-aminomethyl-cyclohexane, 2,4'-diamino-dicyclohexyl methane, 4,4'-diamino-dicyclohexyl methane, 3,3'-dimethyl-4,4'-diamino-dicyclohexyl methane and/or 3,3'-diethyl-4,4'-diamino-dicyclohexyl methane. Suitable ketones include acetone, methyl ethyl ketone, methyl isobutyl ketone, and/or methyl amyl ketone. Often the aliphatic ketimine (b) is prepared from a reaction mixture comprising isophorone diamine and methyl isobutyl ketone.

The aliphatic ketimine (b) is typically present in the curable film-forming composition or coating kit of the present invention in an amount of at least 10, such as at least 15, or least 20, or at least 25 percent by weight, based on the total weight of resin solids in the curable film-forming composition or coating kit. The aliphatic ketimine (b) may be present in the curable film-forming composition or coating kit of the present invention in an amount of at most 50, such as at most 40, or at most 30 percent by weight, based on the total weight of resin solids in the curable film-forming composition or coating kit. Thus, the aliphatic ketimine may be present in the curable film-forming composition or coating kit in an amount, for example, of 10 to 50 percent by weight, or 10 to 40 percent by weight, or 10 to 30 percent by weight, or 15 to 50 percent by weight, or 15 to 40 percent by weight, or 15 to 30 percent by weight, or 20 to 50 percent by weight, or 20 to 40 percent by weight, or 20 to 30 percent by weight, or 25 to 50 percent by weight, or 25 to 40 percent by weight, or 25 to 30 percent by weight. It is usually present in an amount of 10 to 30 percent by weight.

The polyaspartic ester (c) typically has an amino equivalent weight of 270 to 300 grams/equivalent. In particular embodiments of the present invention the polyaspartic ester (c) comprises at least one cyclic aspartic ester functional polyamine. Suitable cyclic aspartic ester functional polyamines include those available from Covestro as DESMOPHEN NH 1420 and 1520. Moreover, additional, different aspartic ester functional diamines may be included. One example of such polyaspartic esters is the derivative of diethyl maleate and 1,5-diamino-2-methylpentane, available commercially from Bayer MaterialScience under the name DESMOPHEN NH 1220. Other suitable amine functional compounds containing aspartate groups may be employed as well. Additionally, the polyaspartic esters can comprise derivatives of compounds such as maleic acid, fumaric acid esters, aliphatic polyamines and the like. All of the polyaspartic esters listed above may be used alone or in various combinations depending on the desired properties of the cured composition.

Use of the polyaspartic ester (c) is particularly advantageous when the compositions of the present invention are applied directly to a metal substrate in a DTM application, but it can also be included in the compositions when they are used as topcoats with intervening layers. Examples of both scenarios are demonstrated in the working Examples below. When the polyaspartic ester (c) is used, it is typically present in the curable film-forming composition or coating kit of the present invention in an amount of at least 30, or least 33, or at least 35, percent by weight, based on the total weight of resin solids in the curable film-forming composition or coating kit. The polyaspartic ester (c) may be present in the curable film-forming composition or coating kit of the present invention in an amount of at most 50, such as at most 47, or at most 45, or at most 40 percent by weight, based on the total weight of resin solids in the curable film-forming composition or coating kit. Thus, the polyaspartic ester may be present in the curable film-forming composition or coating kit in an amount, for example, of 30 to 50 percent by weight, or 30 to 47 percent by weight, or 30 to 45 percent by weight, or 30 to 40 percent by weight, or 33 to 50 percent by weight, or 33 to 47 percent by weight, or 33 to 45 percent by weight, or 33 to 40 percent by weight, or 35 to 50 percent by weight, or 35 to 47 percent by weight, or 35 to 45 percent by weight, or 30 to 40 percent by weight. It is usually present in an amount up to 40 percent by weight.

In particular examples of the present invention, the weight ratio of the acrylic polyol (a) to the polyaspartic ester (c) is 1:4 to 1:2.5 (i. e., 0.25 to 0.4), or 1:4 to 1:2.7 (0.25 to 0.37), or 1:4 to 1:3 (0.25 to 0.33), or 1:4 to 1:3.45 (0.25 to 0.29).

In certain examples of the present invention, the resinous component (1) further comprises (d) a polyester polyol. Such polymers may be prepared in a known manner by condensation of polyhydric alcohols and polycarboxylic acids, with the polyhydric alcohols in stoichiometric excess. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. When used, the polyester polyol may be present in the curable film-forming composition of the present invention in an amount of 5 to 10 percent by weight, based on the total weight of resin solids in the curable film-forming composition.

The curable film-forming compositions and coating kits of the present invention further comprise (2) a curing agent comprising at least two different aliphatic polyisocyanates. Suitable aliphatic polyisocyanates have a number average molecular weight of at least 500, or at least 600, or at least 700, and at most 1100, or at most 1000, or at most 900. Thus, the aliphatic polyisocyanate may have a number average molecular weight of 500 to 1100, or 500 to 1000, or 500 to 900, or 600 to 1100, or 600 to 1000, or 600 to 900, or 700 to 1100, or 700 to 1000, or 700 to 900.

The curable film-forming composition comprises less than 10 percent by weight, or less than 5 percent by weight, or less than 2 percent by weight, or 0 percent by weight of a polyisocyanate polymer or prepolymer, based on the total weight of the curable film-forming composition. Usually, the curable film-forming composition does not comprise a polyisocyanate polymer or prepolymer. Often the curable film-forming composition is essentially free of a polyisocyanate polymer or prepolymer. As used herein, the term "essentially free" with respect to a compound or material in the curable film-forming composition means that the curable film-forming composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

As used herein, the terms "polyisocyanate polymer" and "polyisocyanate prepolymer" refer to the reaction product of polyisocyanate (di- or higher functionality isocyanate) monomer with a polyol and/or other isocyanate reactive group such as a polyamine. Examples may include a reaction product of a polyisocyanate monomer with 1,3-propanediol, 1,4-butanediol and/or 1,6-hexanediol, diethylene glycol, triethylene glycol or tetraethylene glycol with diarylcarbonates or cyclic carbonates. Examples of other polyisocyanate prepolymers and polyisocyanate polymers include reaction products of a polyisocyanate monomer with a polyol of number average molecular weight 62 to 20,000, such as polyester polyols, polycaprolactone polyols, polyether polyols, polyhydroxy polycarbonates, polyhydroxy polyacetals, polyhydroxy polyacrylates, polyhydroxy polyester amides, polyhydroxy polythioethers.

Usually, the aliphatic polyisocyanates used in the curable film-forming composition of the present invention are selected from 4,4'-methylene-bis(cyclohexyl isocyanate), isophorone diisocyanate, 2,2,4-trimethyl hexamethylene diisocyanate, 2,4,4-trimethyl hexamethylene diisocyanate, 1,6-hexamethylene diisocyanate, a biuret of one or more of the preceding aliphatic polyisocyanates, and an isocyanurate of one or more of the preceding aliphatic polyisocyanates. Examples of commercially available aliphatic polyisocyanates include DESMODUR Z4470 and DESMODUR N3300A, both available from Covestro, and CORONATE HXR, available from Palmer Holland.

The curing agent (2) is typically present in the curable film-forming composition or coating kit of the present invention in an amount of at least 45, such as at least 46, or least 48 percent by weight, based on the total weight of resin solids in the curable film-forming composition or coating kit. The curing agent (2) may be present in the curable film-forming composition or coating kit of the present invention in an amount of at most 70, such as at most 60, or at most 50 percent by weight, based on the total weight of resin solids in the curable film-forming composition or coating kit. Thus, the curing agent may be present in the curable film-forming composition or coating kit in an amount, for example, of 45 to 70 percent by weight, or 45 to 60 percent by weight, or 45 to 50 percent by weight, or 46 to 70 percent by weight, or 46 to 60 percent by weight, or 46 to 50 percent by weight, or 48 to 70 percent by weight, or 48 to 60 percent by weight, or 48 to 50 percent by weight. It is usually present in an amount of 45 to 50 percent by weight. Typically, the equivalent ratio of isocyanate functional groups in the curing agent (2) to total active hydrogen functional groups in the polyaspartic ester (c), aliphatic ketimine (b), and acrylic polyol (a) is 1:1 to 1.2:1.

In certain examples of the present invention in the preparation of a semi-gloss coating (defined below), the curable film-forming composition or coating kit further comprises (3) a matting agent, present in the curable film-forming composition or coating kit in an amount of 3 to 5 percent by weight, based on the total weight of curable film-forming composition or coating kit. The matting agent typically comprises (a) precipitated silica that is surface treated with wax and that demonstrates a number average d50 particle size of 5 to 7 microns, or 6 to 7 microns, such as 6.3 microns; and (b) organic polymeric particles that demonstrate a density of 1.4 to 2.0 g/$cm^3$ and a volume average d50 particle size of 4 to 6 microns, or 4.5 to 5.5 microns, such as 5 microns. Particle sizes may be measured by Test Method ISO 13320-2009 using laser diffraction. Density may be measured using Test Method ISO 787-10. Examples of suitable matting agents include ACEMATT OK 412, commercially available from Evonik Resource Efficiency GmbH, and CERAFLOUR 920, commercially available from BYK USA, Inc.

As noted above, the present invention is also drawn to coating kits. It is often not practical to store ambient-cure coatings as a one-package composition, but rather they must be stored as multi-package coatings to prevent the reactive constituents from curing prior to use. The term "multi-package coatings" refers to coatings in which various constituents are maintained separately until just prior to application. The coating kits of the present invention are usually multi-package coatings comprising separate packages, such as wherein a first package comprises the resinous component (1), and a second package comprises the curing agent (2). In a particular example of the present invention, the curable film-forming composition or coating kit comprises separate packages, wherein a first package comprises the resinous component (1) and the matting agent (3); and a second package comprises the curing agent (2). The packages are separate from one another until immediately prior to application of the curable film-forming composition to a substrate.

The curable film-forming compositions or coating kits of the present invention can include a variety of optional ingredients and/or additives that are somewhat dependent on the particular application of the curable composition, such as reinforcements, accelerators, catalysts, which are often added to the second reactive package, surfactants, defoamers, air release additives, flow additives, slip additives, abrasion/scratch resistance additive, plasticizers, extenders, oligomers such as urethane and acrylates, rheology additives, stabilizers, diluents, antioxidants, fire retardants, UV agents, hindered amine light stabilizers (monomeric and polymeric), chemical blowing agents, and/or moisture scavengers. These additives may be present in either or both of the reactive packages. Generally, the amount of optional additional ingredients is up to about 30 weight percent, such as up to 5 percent by weight, or up to 1 percent by weight, based on the total weight of the curable composition and depending on the nature of the ingredient.

Diluents and plasticizers can be present in an amount of up to about 50 weight percent of the total weight of the curable composition. Examples of suitable diluents include low weight average molecular weight (from about 100 to about 2000) aliphatic or aromatic ester compounds containing one or more ester linkages, and low weight average molecular weight aliphatic or aromatic ethers containing one or more ether linkages and combinations thereof. Reactive diluents are designed to modify strength and/or adhesion of the cured composition, such as aliphatic and/or aromatic mono, di, or tri epoxides having a weight average molecular weight of about 300 to about 1500, can be present in the range of up to about 30 weight percent of the total weight of the curable composition (often 5 to 10 percent).

The compositions used in the present invention can also include a colorant. As used herein, the term "colorant" means any substance that imparts color but not necessarily opacity to the composition. The colorant should be selected to yield the desired visual effect of the composition. For example, the colorant does not typically affect the clarity or transparency of the composition. The colorant can be added to the coating in any suitable form, such as discrete particles, dispersions, solutions and/or flakes. A single colorant or a mixture of two or more colorants can be used in the coatings of the present invention. Optionally, the colorant may impart some opacity to create a translucent coating.

Example colorants include pigments, dyes and tints, such as those listed in the Dry Color Manufacturers Association (DCMA), as well as special effect compositions. A colorant can be organic or inorganic. Colorants can be incorporated into the coatings by grinding or simple mixing. Colorants can be incorporated by grinding into the coating by use of a grind vehicle, such as an acrylic or amine grind vehicle, the use of which will be familiar to one skilled in the art.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to COLORMATCH AD series commercially available from Plasticolors, CHARISMA COLORANTS and MAXITONER INDUSTRIAL COLORANTS commercially available from Accurate Dispersions division of Eastman Chemical, Inc.

In certain embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition is irradiated, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The curable film-forming compositions of the present invention are typically liquid at ambient temperature or room temperature. By "liquid" is meant that the compositions have a viscosity that allows them to be at least extrudable. The compositions may have a viscosity that allows them to be at least pumpable (such as 250 to 700 centipoise), more often at least sprayable (such as at most 170 centipoise, or at most 73 centipoise, or at most 38 centipoise, when measured at 25° C. according to ASTM D4287-00 with a Brookfield CAP2000+ Viscometer at 900−/1 seconds shear rate with a #4 Spindle). Liquid compositions that are suitable for use in the present invention include liquid resin systems that are 100 percent solids, liquid resins that are dissolved or dispersed in a liquid medium, and solid particulate resins that are dispersed in a liquid medium. Liquid media may be organic solvent based. Typically, the film-forming composition is solventborne. The solvent may be present in at least one of the reactive packages and each reactive package may independently contain one or more different solvents from the others. Examples of suitable solvents include ketones such as acetone, methylethyl ketone, methylamyl ketone, methylisobutyl ketone; aldehydes such as formaldehyde, acetaldehyde, and the like.

The curable film-forming compositions and kits of the present invention most often demonstrate a solids content of at least 60, or at least 65, or at least 68, and at most 80, or at most 77, or at most 75 percent by weight, based on the total weight of the curable film-forming composition. Thus, the curable film-forming compositions and kits of the present invention typically demonstrate a solids content of 60 to 80 percent by weight, or 60 to 77 percent by weight, or 60 to 75 percent by weight, or 65 to 80 percent by weight, or 65 to 77 percent by weight, or 65 to 75 percent by weight, or 68 to 80 percent by weight, or 68 to 77 percent by weight, or 68 to 75 percent by weight Additionally or alternatively, the curable film-forming composition has a volatile organic compound (VOC) content less than 2.7, or less than 2.6, or less than 2.5 lb/gallon.

The curable film-forming compositions of the present invention are often formulated as either high-gloss or semi-gloss coatings, as noted above. After application of the curable film-forming composition of the present invention to a substrate and after curing to form a cured high-gloss coating, the cured high-gloss coating usually demonstrates a 20° surface gloss greater than 70, or greater than 75, or greater than 85, and less than 95 or less than 90, as measured according to ASTM D-523-14. Exemplary ranges include 70 to 95, or 70 to 90, or 75 to 95, or 75 to 90, or 85 to 95, or 85 to 90. The cured high-gloss coating usually demonstrates 60° surface gloss of greater than 85, or greater than 90, and less than 98 or less than 96, as measured according to ASTM D-523-14. Exemplary ranges include 85 to 98, or 85 to 96, or 90 to 98, or 90 to 96. In particular examples of the present invention, when the composition is applied directly to a metal substrate surface ("DTM"), the cured high-gloss coating usually demonstrates a 20° surface gloss greater than 70 and less than 75, and a 60° surface gloss of greater than 85 and less than 95. In another example, when the composition is applied as a topcoat over an intervening coating layer on a substrate surface, the cured high-gloss coating usually demonstrates a 20° surface gloss greater than 85 and less than 90, and a 60° surface gloss of greater than 85 and less than 96.

After application of the curable film-forming composition of the present invention to a substrate and after curing to form a cured semi-gloss coating, the cured semi-gloss coating usually demonstrates a 20° surface gloss greater than 5, or greater than 8, and less than 15 or less than 10, as measured according to ASTM D-523-14. Exemplary ranges include 5 to 15, or 5 to 10, or 8 to 15, or 8 to 10. The cured semi-gloss coating usually demonstrates a 60° surface gloss of greater than 40, or greater than 43, and less than 50 or less than 47, as measured according to ASTM D-523-14. Exemplary ranges include 40 to 50, or 40 to 47, or 43 to 50 or 43 to 47. In particular examples of the present invention, when the composition is applied directly to a metal substrate surface ("DTM"), the cured semi-gloss coating usually demonstrates a 20° surface gloss greater than 5 and less than 15, and a 60° surface gloss of greater than 40 and less than 50.

The present invention is further drawn to coated structures. The coated structures of the present invention may comprise (a) one or more components of any of a number of different structures that may be exposed to environmental conditions. Examples include components of a vehicle such as an automobile, watercraft, aircraft, truck, or bus; building; bridge; industrial protective structure such as a barrier wall or fence; construction equipment structure, for example, a boom, crane, lift, or construction vehicle such as a bulldozer; ship; railcar; railcar container; water tower; power line tower; tunnel; oil or gas industry structure such as a platform; marine structure; aerospace structure; bridge support structure; pipeline; oil rig; storage tank; or wind turbine.

The component (a) comprises a metal substrate. Suitable substrates for use in the present invention include rigid metal substrates such as ferrous metals, aluminum, aluminum alloys, copper, brass, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, and combinations thereof. Profiled metals such as profiled steel are also suitable. By "profiled" is meant that the substrate surface has been physically modified such as by mechanically or chemically etching, abrading such as by sanding or blasting, carving, brushing, hammering, stamping, or punching, to affect the topography of the metal surface. Combinations or composites of ferrous and non-ferrous metals can also be used.

Before depositing any compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner for metal substrates commercially available from PPG Industries, Inc.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls.

Metal substrates to be used may be bare substrates such that the curable film-forming composition is applied as a direct-to-metal (DTM) coating. By "bare" is meant a virgin substrate that has not been treated with (or has been stripped of) any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates used in a DTM system may undergo one or more treatment steps known in the art prior to the application of the curable film-forming composition.

The coated structures of the present invention further comprise (b) a cured coating, formed from the curable film-forming composition described above applied to at least one surface of the substrate.

When applied DTM, the curable film-forming compositions may be used as a primer with one or more subsequent topcoats applied, or as a direct gloss topcoat, depending on the intended industrial application. Alternatively, the coated structure may comprise at least one additional film-forming composition applied between the curable film-forming composition and the substrate, such as an electrodeposited coating, a primer, a sealer, and/or a basecoat.

The compositions may be applied to the substrate by one or more of a number of methods including spraying, dipping/immersion, brushing, or flow coating, but they are most often applied by spraying. The usual spray techniques and equipment for air spraying, airless spraying, and electrostatic spraying and either manual or automatic methods can be used. The coating composition may be applied in a continuous process to the substrate surface as the substrate moves along a conveyor to form a coated substrate. The steps of applying the coating composition may be adapted to an existing continuous production line for manufacturing an industrial article. The coating composition may be applied to the substrate prior to or after construction of the component.

The coating layer formed by the curable film-forming composition of the present invention typically has a dry film thickness of a broad range; i. e., anywhere from 5 microns to 25.4 mm, depending on the particular industrial application. For example, a shop coating may have a dry film thickness of 5 to 30 microns. In general, the dry film thickness of the coating may range from 2-25 mils (50.8-635 microns), often 5-25 mils (127-635 microns).

After forming a coating on the substrate, the composition can be cured by allowing it to stand at ambient temperature, or a combination of ambient temperature cure and baking, such as at temperatures ranging from 100° F. (37.8° C.) to about 300° F. (148.9° C.). The composition can be cured at ambient temperature typically in a period ranging from about 1 to 3 hours. If ambient humidity is below 40% relative humidity then cure times may be extended.

The cured coating typically demonstrates an adhesion rating of 5B seven days after application of the curable film-forming composition to a metal substrate, when subjected to ASTM D3359-09.

Coated structures of the present invention also demonstrate excellent gloss retention and corrosion resistance when subjected to simulated weathering tests, as demonstrated in the non-limiting Examples below.

The following working Examples are intended to further describe the invention. It is understood that the invention described in this specification is not necessarily limited to the examples described in this section. Components that are mentioned elsewhere in the specification as suitable alternative materials for use in the invention, but which are not demonstrated in the working Examples below, are expected to provide results comparable to their demonstrated counterparts. Unless otherwise indicated, all parts are by weight.

EXAMPLES

Examples 1 to 4 demonstrate the preparation of multi-package curable film-forming compositions of the present invention, suitable for use as coating kits. Example 1 illustrates a high-gloss curable film-forming composition prepared using an acrylic polyol, an aliphatic ketimine, and a polyaspartic ester, applied to a substrate as a topcoat. Example 2 illustrates a high-gloss curable film-forming composition prepared using an acrylic polyol, an aliphatic ketimine, and a polyaspartic ester, applied as a DTM coating to a substrate. Example 3 illustrates a semi-gloss curable film-forming composition prepared using an acrylic polyol, an aliphatic ketimine, and a polyaspartic ester, applied as a DTM coating to a substrate. Example 4 illustrates a high-gloss curable film-forming composition prepared using an acrylic polyol, an aliphatic ketimine, but no polyaspartic ester, applied to a substrate as a topcoat. The compositions of each Example were prepared using the ingredients listed in the Table below, prepared as separate packages ("Side A" and "Side B"). The packages were combined immediately prior to application to the substrates. Compositions were spray applied to BONDERITE1000 P99X and blasted steel substrates to achieve dry film thicknesses (DFTs) of about 3 to 5 mils (BONDERITE) and about 5 to 6 mils (blasted steel). Both substrates are available from ACT TEST PANELS LLC.

| SIDE | INGREDIENT | "EXAMPLE 1" HIGH GLOSS TOPCOAT | "EXAMPLE 2" HIGH GLOSS DIRECT TO METAL | "EXAMPLE 3" SEMI-GLOSS DIRECT TO METAL | "EXAMPLE 4" HIGH GLOSS TOPCOAT |
|---|---|---|---|---|---|
| A | Aliphatic IPDA diketimine (1) | 5.77 | 4.04 | 3.46 | 11.55 |
| | Acrylic polyol (2) | 6.89 | 4.83 | 4.13 | 13.81 |
| | Desmophen NH 1520 (3) | 14.05 | 9.91 | 8.42 | 0.00 |
| | Disperbyk 163 (4) | 1.08 | 0.00 | 0.00 | 1.08 |
| | Disperbyk 110 (5) | 0.00 | 1.24 | 1.50 | 0.00 |
| | Silicon-free defoamer | 0.66 | 0.60 | 0.56 | 0.66 |
| | Polyether modified polydimethylsiloxane surfactant | 0.59 | 0.30 | 0.23 | 0.59 |

-continued

| SIDE | INGREDIENT | "EXAMPLE 1" HIGH GLOSS TOPCOAT | "EXAMPLE 2" HIGH GLOSS DIRECT TO METAL | "EXAMPLE 3" SEMI-GLOSS DIRECT TO METAL | "EXAMPLE 4" HIGH GLOSS TOPCOAT |
|---|---|---|---|---|---|
| | Bis(1,2,2,6,6-pentamethyl-4-piperidinyl)-sebacate & 1-(Methyl)-8-(1,2,2,6,6-pentamethyl-4-piperidinyl)-sebacate | 2.33 | 2.25 | 2.29 | 2.33 |
| | Hydroxyphenylbenzotriazole | 0.78 | 0.74 | 0.80 | 0.79 |
| | Cationic Amine functional fatty carboxylate | 0.00 | 0.50 | 0.00 | 0.00 |
| | Modified Bentonite clay | 0.00 | 0.76 | 0.00 | 0.00 |
| | Fumed silica | 0.73 | 0.00 | 0.00 | 0.38 |
| | Organophilic phyllosilicate | 0.38 | 0.00 | 0.00 | 0.38 |
| | ACEMATT OK-412 (6) | 0.00 | 0.00 | 1.87 | 0.00 |
| | CERAFLOUR 920 (7) | 0.00 | 0.00 | 1.87 | 0.00 |
| | Titanium dioxide | 18.84 | 17.03 | 16.29 | 18.88 |
| | Barium sulfate | 7.14 | 8.07 | 8.89 | 7.15 |
| | Calcium carbonate (Wollastonite) | 0.00 | 8.07 | 8.89 | 0.00 |
| | Magnesium silicate (Talc) | 0.00 | 0.00 | 3.27 | 0.00 |
| | Zinc orthophosphate | 0.00 | 3.67 | 5.38 | 0.00 |
| | Ion-exchanged silica | 0.00 | 3.67 | 0.00 | 0.00 |
| | Zinc aluminum orthophosphate | 0.00 | 0.00 | 0.00 | 0.00 |
| | Isovalerone | 4.12 | 2.72 | 2.81 | 4.64 |
| | Butyl ethanoate | 2.36 | 2.13 | 0.00 | 2.36 |
| | Butanone | 6.03 | 4.78 | 6.23 | 5.67 |
| B | DESMODUR Z4470BA (8) | 11.56 | 4.66 | 4.00 | 11.86 |
| | DESMODUR N 3300A (9) | 11.65 | 11.88 | 10.16 | 11.96 |
| | 2-Heptanone | 3.72 | 1.50 | 1.28 | 3.82 |
| | Butyl ethanoate | 1.27 | 1.41 | 1.20 | 1.30 |
| | Butanone | 0.05 | 4.25 | 5.63 | 0.79 |
| | Methoxypropyl acetate | 0.00 | 0.99 | 0.84 | 0.00 |

(1) Diketimine prepared from the reaction of isophoronediamine (IPDA) and methyl isobutyl ketone.
(2) Acrylic polyol resin prepared from the reaction of 2-hydroxyethyl acrylate, methyl methacrylate, styrene monomer and butyl acrylate.
(3) Cyclic aspartic ester functional polyamine commercially available from COVESTRO LLC (Baytown, Texas)
(4), (5) Wetting and dispersing additives, commercially available from BYK CHEMIE (Wesel, Germany)
(6) Matting agent commercially available from Evonik Resource Efficiency GmbH
(7) Matting agent commercially available from BYK USA, Inc.
(8), (9) Aliphatic polyisocyanates commercially available from COVESTRO

| | Example 1 | Example 2 | Example 3 | Example 4 |
|---|---|---|---|---|
| Solids by weight | 76.00% | 78.00% | 78.59% | 72.98% |
| Solids by volume | 64.11% | 63.52% | 62.55% | 60.14% |
| VOC (lb/gal) | 2.50 | 2.50 | 2.50 | 2.75 |
| Sprayable Pot-life, min | 60 | 60 | 60 | 60 |
| Air-dry time (dry to handle), hrs | <3 | <3 | <3 | <3 |

TABLE 1

| Properties | | Example 1 High Gloss Topcoat | Example 2 High Gloss DTM | Example 3 Semi-Gloss DTM | Example 4 High Gloss Topcoat |
|---|---|---|---|---|---|
| Color | | White | White | White | White |
| Sprayable Pot-Life,[1] minutes | | 60 | 60 | 50 | 60 |
| Air-dry time (dry to handle), hours | | <3 | <3 | <3 | <3 |
| Gloss, GU | 20° | 88.6 | 73.0 | 9.5 | 87.0 |
| | 60° | 95.2 | 92.0 | 45.7 | 94.1 |
| Gloss Retention[2], % | 20° | 79.5 | 45.0 | 84.7 | 85.2 |
| (at 2000 hrs) | 60° | 92.6 | 81.2 | 96.6 | 96.4 |
| ΔE (at 2000 hrs)[3] | | 0.70 | 0.66 | 0.50 | 0.23 |
| Salt Spray Corrosion | B1000 P99X (500 h) | NA | 1.4 | 2.2 | NA |

TABLE 1-continued

| Properties | | Example 1 High Gloss Topcoat | Example 2 High Gloss DTM | Example 3 Semi-Gloss DTM | Example 4 High Gloss Topcoat |
|---|---|---|---|---|---|
| (scribe creep),[4] mm | Blasted steel (1000 h) | NA | 0 | 0 | NA |
| Adhesion[5] | | 5B | 5B | 5B | 5B |

[1]Sprayable Pot-Life. Coating has a pot life of at least 60 minutes (this means the mixture of Sides A and B is sprayable during 60 minutes without affecting gloss and film appearance)
[2]Percentage gloss retention. After the samples were exposed to an arc xenon cabinet (simulated weathering resistance)
[3]Color stability. After the samples were exposed to an arc xenon cabinet (simulated weathering resistance). A AE of 1 is barely perceptible and a AE greater than 3 is perceived as two different colors. Measured with an X-Rite 17 Color Spectrophotometer from X-Rite.
[4]Salt Spray Corrosion. Evaluated according to ASTM B117-19; Coated BONDERITE panels were evaluated after 500 hours. Coated blasted steel panels were evaluated after 1000 hours.
[5]Adhesion. Measured after seven days according to ASTM D3359-09.

As shown in the Properties Table 1 above, curable film-forming compositions of the present invention demonstrate excellent gloss, color stability, adhesion, and corrosion resistance.

The compositions of Examples 1 and 2 were additionally compared to commercial controls, and demonstrate excellent properties that are at least comparable to the commercial controls with respect to solids, adhesion and gloss, and excellent in gloss retention, pot life, and air-dry time, as shown in Table 2 below.

TABLE 2

| PROPERTIES | | EXAMPLE 1 | AMERCOAT 450, available from PPG | EXAMPLE 2 | KWIKSPAR 600, available from PPG |
|---|---|---|---|---|---|
| Coating | | 2K Topcoat | 2K Topcoat | 2K DTM | 2K DTM |
| Mix ratio, by volume | | 2:1 | 4:1 | 2:1 | 1:1 |
| Solids by weight | | 76.00% | 79.00% | 78.00% | 76.20% |
| Solids by volume | | 64.11% | 67.00% | 63.52% | 65.82% |
| VOC (lb/gal) | | 2.50 | 2.60 | 2.50 | 2.50 |
| Sprayable Pot-life | | 60 min | 4 h | 60 min | 60 min |
| Air-dry time (dry to handle) | | <3 h | 8 h | <3 h | <3 h |
| Gloss | 20° | 89.4 | 60.4 | 89.5 | 49.9 |
| | 60° | 95.4 | 93.3 | 95.1 | 85.3 |
| Cross Hatch Adhesion (ASTM 3359) | | 5B | 5B | 5B | 5B |
| Gloss retention | 20° | 72 | 58.5 | 41.7 | 32.5 |
| (3000 h) | 60° | 91 | 84 | 77.3 | 72.9 |
| AE, at 3000 hours | | 0.6 | 0.66 | 1.5 | 0.91 |
| Salt Spray Corrosion (scribe creep), mm at 1000 hrs | | NA | NA | 0.00 | 2.8 |

Whereas particular embodiments of this invention have been described above for purposes of illustration, it will be evident to those skilled in the art that numerous variations of the details of the present invention may be made without departing from the scope of the invention as defined in the appended claims.

Therefore, what is claimed is:

1. A curable film-forming composition comprising:

(1) a resinous component comprising:

(a) an acrylic polyol;

(b) an aliphatic ketimine that is substantially free of silane functional groups; and optionally (c) a polyaspartic ester; and (2) a curing agent comprising at least two different aliphatic polyisocyanates, wherein the curable film-forming composition comprises less than 10 percent by weight of a polyisocyanate polymer or prepolymer, based on the total weight of the curable film-forming composition.

2. The curable film-forming composition of claim 1, wherein the polyaspartic ester (c) is present.

3. The curable film-forming composition of claim 1, wherein the acrylic polyol (a) has a hydroxyl equivalent weight of at least 650 g/equivalent, and at most 750 g/equivalent, and wherein the acrylic polyol is prepared from a monomer mixture comprising butyl acrylate and 2-hydroxyethyl acrylate.

4. The curable film-forming composition of claim 1, wherein the equivalent ratio of isocyanate functional groups in the curing agent (2) to total active hydrogen functional groups in the resinous component (1) is 1:1 to 1.2:1.

5. The curable film-forming composition of claim 1, wherein the aliphatic polyisocyanates comprise at least two of 4,4'-methylene-bis(cyclohexyl isocyanate), isophorone diisocyanate, 2,2,4-trimethyl hexamethylene diisocyanate, 2,4,4-trimethyl hexamethylene diisocyanate, 1,6-hexamethylene diisocyanate, a biuret of one or more of the preceding aliphatic polyisocyanates, and an isocyanurate of one or more of the preceding aliphatic polyisocyanates.

6. The curable film-forming composition of claim 1, wherein after application of the curable film-forming composition to a substrate and after curing to form a cured coating, the cured coating demonstrates a 20° surface gloss greater than 70 and less than 95, and a 60° surface gloss of greater than 85 and less than 98, as measured according to ASTM D-523-14.

7. The curable film-forming composition of claim 1, wherein the curable film-forming composition has a solids content of at least 60 percent by weight and at most 80 percent by weight, based on the total weight of the curable film-forming composition.

8. The curable film-forming composition of claim 1, wherein the curable film-forming composition comprises separate packages, wherein a first package comprises the resinous component (1) and the matting agent (3) if present; and wherein a second package comprises the curing agent (2); and wherein the packages are separate from one another until immediately prior to application of the curable film-forming composition to a substrate.

9. The curable film-forming composition of claim 1, wherein the resinous component (1) further comprises (d) a polyester polyol.

10. The curable film-forming composition of claim 1, wherein the aliphatic ketimine (b) is prepared from a reaction mixture comprising:

(1) a diamine comprising isophorone diamine, ethylene diamine, 1,2-diaminopropane, 1,4-diaminobutane, 1,5-diaminopentane, 1,6-diaminohexane, 1,8-diaminooctane, 2-methyl-1,5-pentane diamine, 2,5-diamino-2,5-dimethylhexane, 2,2,4-trimethyl-1,6-diamino-hexane, 2,4,4-trimethyl-1,6-diamino-hexane, 1,11-diaminoundecane, 1,12-diaminododecane, 1,3-cyclohexane diamine, 1,4-cyclohexane diamine, 1-amino-3,3,5-trimethyl-5-aminomethyl-cyclohexane, 2,4'-diamino-dicyclohexyl methane, 4,4'-diamino-dicyclohexyl methane, 3,3'-dimethyl-4,4'-diamino-dicyclohexyl methane and/or 3,3'-diethyl-4,4'-diamino-dicyclohexyl methane; and (2) a ketone comprising acetone, methyl ethyl ketone, methyl isobutyl ketone, and/or methyl amyl ketone.

11. The curable film-forming composition of claim 10, wherein the aliphatic ketimine (b) is prepared from a reaction mixture comprising isophorone diamine and methyl isobutyl ketone.

12. The curable film-forming composition of claim 1, further comprising (3) a matting agent present in the curable film-forming composition in an amount of 3 to 5 percent by weight, based on the total weight of the curable film-forming composition, wherein the matting agent comprises (a) precipitated silica that is surface treated with wax and that demonstrates a number average d50 particle size of 5 to 7 microns, as measured by Test Method ISO 13320-2009 using laser diffraction; and (b) organic polymeric particles that demonstrate a density of 1.4 to 2.0 $g/cm^3$, as measured by Test Method ISO 787-10, and a volume average d50 particle size of 4 to 6 microns, as measured by Test Method ISO 13320-2009 using laser diffraction.

13. The curable film-forming composition of claim 12, wherein after application of the curable film-forming composition to a substrate and after curing to form a cured coating, the cured coating demonstrates a 20° surface gloss greater than 5 and less than 15, and a 60° surface gloss of greater than 40 and less than 50, as measured according to ASTM D-523-14.

14. A coated structure comprising:

(a) a component of a vehicle, building, bridge, industrial protective structure, construction equipment structure, ship, railcar, railcar container, water tower, power line tower, tunnel, oil or gas industry structure, marine structure, aerospace structure, bridge support structure, pipeline, oil rig, storage tank, or wind turbine, wherein said component comprises a metal substrate; and (b) a cured coating, wherein the cured coating is formed from the curable film-forming composition of claim 1 applied to at least one surface of the substrate.

15. The coated structure of claim 14, wherein the polyaspartic ester is present in the curable film-forming composition, and the curable film-forming composition is applied directly to at least one surface of the substrate.

16. The coated structure of claim 14, wherein the substrate comprises one or more of a ferrous metal, aluminum, an aluminum alloy, copper, and brass.

17. The coated structure of claim 16, wherein the substrate comprises profiled steel.

18. A coating kit comprising:

(1) a resinous component comprising:

(a) an acrylic polyol; and (b) an aliphatic ketimine that is substantially free of silane functional groups; and optionally (c) a polyaspartic ester; and (2) a curing agent comprising at least two different aliphatic polyisocyanates, wherein the coating kit comprises less than 10 percent by weight of a polyisocyanate polymer or prepolymer, based on the total weight of the coating kit.

19. The coating kit of claim 18 comprising multiple, separate packages, wherein a first package comprises the resinous component (1), and a second package comprises the curing agent (2).

20. The coating kit of claim 18, wherein the resinous component (1) further comprises (d) a polyester polyol.

* * * * *